(12) United States Patent
Cao et al.

(10) Patent No.: US 10,727,743 B2
(45) Date of Patent: *Jul. 28, 2020

(54) SYSTEMS AND METHODS FOR ENHANCING DYNAMIC RESPONSE OF POWER CONVERSION SYSTEMS

(71) Applicant: ON-BRIGHT ELECTRONICS (SHANGHAI) CO., LTD., Shanghai (CN)

(72) Inventors: Yaming Cao, Shanghai (CN); Dongze Yang, Shanghai (CN); Qiang Luo, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/205,023

(22) Filed: Nov. 29, 2018

(65) Prior Publication Data

US 2019/0165674 A1 May 30, 2019

Related U.S. Application Data

(63) Continuation of application No. 15/725,228, filed on Oct. 4, 2017, now Pat. No. 10,193,443, which is a (Continued)

(30) Foreign Application Priority Data

Jul. 9, 2012 (CN) .......................... 2012 1 0236882

(51) Int. Cl.
*H02M 3/156* (2006.01)
*G05F 1/10* (2006.01)
*H02M 1/00* (2006.01)

(52) U.S. Cl.
CPC .............. *H02M 3/156* (2013.01); *G05F 1/10* (2013.01); *H02M 2001/0003* (2013.01)

(58) Field of Classification Search
CPC . H02M 2001/0003; H02M 2003/1566; H02M 2001/0025; H02M 3/156
See application file for complete search history.

(56) References Cited

U.S. PATENT DOCUMENTS 4,371,840 A 2/1983 Yokoyama
6,028,776 A 2/2000 Ji et al.
(Continued)

FOREIGN PATENT DOCUMENTS

CN 101478237 7/2009
CN 101676829 3/2010
(Continued)

OTHER PUBLICATIONS

China Patent Office, Office Action dated May 26, 2014, in Application No. 201210236882.2.
(Continued)

*Primary Examiner* — Gary L Laxton
(74) *Attorney, Agent, or Firm* — Faegre Drinker Biddle & Reath LLP

(57) ABSTRACT

System and method for regulating a power conversion system. For example, a system controller for regulating a power conversion system includes an amplifier, a variable-resistance component, a capacitor, and a modulation and drive component. The amplifier is configured to receive a reference signal and a feedback signal associated with an output signal of the power conversion system, the amplifier including an amplifier terminal. The variable-resistance component is associated with a first variable resistance value, the variable-resistance component including a first component terminal and a second component terminal, the (Continued)

first component terminal being coupled with the amplifier terminal. The capacitor includes a first capacitor terminal and a second capacitor terminal, the first capacitor terminal being coupled with the second component terminal. The modulation and drive component includes a first terminal and a second terminal, the first terminal being coupled with the amplifier terminal.

3 Claims, 11 Drawing Sheets

Related U.S. Application Data continuation of application No. 14/963,088, filed on Dec. 8, 2015, now Pat. No. 9,819,262, which is a continuation of application No. 13/554,977, filed on Jul. 20, 2012, now Pat. No. 9,244,472.

(56) References Cited

U.S. PATENT DOCUMENTS

| | | | |
|---|---|---|---|
| 6,954,367 B2 | 10/2005 | Yang et al. | |
| 7,054,170 B2 | 5/2006 | Yang et al. | |
| 7,777,468 B2 | 8/2010 | Okuda et al. | |
| 8,605,845 B2 | 12/2013 | Chen et al. | |
| 8,624,511 B2 | 1/2014 | Cavallini et al. | |
| 8,786,268 B2 * | 7/2014 | Li | H02M 3/156 323/283 |
| 9,065,342 B2 | 6/2015 | Hosono | |
| 9,244,472 B2 * | 1/2016 | Cao | G05F 1/10 |
| 9,819,262 B2 | 11/2017 | Cao et al. | |
| 10,193,443 B2 | 1/2019 | Cao et al. | |
| 2004/0239301 A1 * | 12/2004 | Kobayashi | H02M 3/1588 323/284 |
| 2005/0218874 A1 | 10/2005 | Gibson et al. | |
| 2011/0193539 A1 | 8/2011 | Schmidt et al. | |
| 2012/0139519 A1 * | 6/2012 | Dearborn | H02M 3/1588 323/290 |
| 2014/0009132 A1 | 1/2014 | Cao et al. | |
| 2014/0191740 A1 | 7/2014 | Ferrario et al. | |
| 2016/0149487 A1 | 5/2016 | Cao et al. | |
| 2018/0091047 A1 | 3/2018 | Cao et al. | |

FOREIGN PATENT DOCUMENTS

| | | |
|---|---|---|
| CN | 101807852 | 8/2010 |
| CN | 101847028 | 9/2010 |
| TW | 392999 | 6/2000 |
| TW | I 238592 | 8/2005 |
| TW | 200827971 | 7/2008 |
| TW | I 331441 | 10/2010 |
| TW | I 343692 | 6/2011 |
| TW | M 428391 | 5/2012 |
| WO | WO 2005/067126 | 7/2005 |

OTHER PUBLICATIONS

Taiwan Patent Office, Office Action dated Oct. 6, 2014, in Application No. 101144023.

* cited by examiner

SYSTEMS AND METHODS FOR ENHANCING DYNAMIC RESPONSE OF POWER CONVERSION SYSTEMS

1. CROSS-REFERENCES TO RELATED APPLICATIONS

This application is a continuation of U.S. patent application Ser. No. 15/725,228, filed Oct. 4, 2017, which is a continuation of U.S. patent application Ser. No. 14/963,088, filed Dec. 8, 2015, which is a continuation of U.S. patent application Ser. No. 13/554,977, filed Jul. 20, 2012, which claims priority to Chinese Patent Application No. 201210236882.2, filed Jul. 9, 2012, all of the above-referenced applications being commonly assigned and incorporated by reference herein for all purposes.

2. BACKGROUND OF THE INVENTION

The present invention is directed to integrated circuits. More particularly, the invention provides systems and methods for enhancing dynamic responses. Merely by way of example, the invention has been applied to power conversion systems. But it would be recognized that the invention has a much broader range of applicability.

A switching power conversion system often needs not only a good dynamic response under different load conditions, but also good stability. FIG. 1 is a simplified diagram showing a conventional switching power conversion system with a step-down structure. The switching power conversion system 100 includes a system controller 102, a switch 104, a capacitor 106, two diodes 108 and 110, and an inductor 112. For example, an output voltage 120 of the power conversion system 100 usually needs to be regulated to be approximately constant, and relatively stable if output load varies.

FIG. 2 is a simplified conventional diagram showing certain components of the system controller 102 as part of the power conversion system 100. The system controller 102 includes an error amplifier 202, a control component 204, and a gate driver 206. In addition, the system controller 102 uses a compensation network 208 that includes capacitors 210 and 212 and a resistor 214.

The error amplifier 202 receives a feedback signal 216 that is related to the output voltage 120 and a reference signal 218 and generates an amplified signal 220 which indicates load conditions of the system 100. The control component 204 receives the amplified signal 220 and outputs a modulation signal 222 to the gate driver 206 which generates a gate drive signal 224 to drive the switch 104. The compensation network 208 is connected to an output terminal of the error amplifier 202. If the amplified signal 220 is large in magnitude which indicates that the average output voltage 120 is far different from the reference signal 218, the control component 204 adjusts the modulation signal 222 to increase the switching frequency and duty cycles so that more power can be delivered to the output load.

A bandwidth of the control loop often needs to be very small in order to regulate the output voltage 120 to be approximately constant. The dominant pole of the control loop is associated with the error amplifier 202 and the compensation network 208. Usually, the capacitor 212 has a large capacitance in order to reduce the bandwidth of the control loop. But, the large capacitance of the capacitor 212 negatively affects the dynamic response of the power conversion system 100 if the load conditions change.

To achieve a good dynamic response, a wide bandwidth of the control loop for the power conversion system 100 is often needed. For example, the compensation network 208 can be removed to increase the bandwidth of the control loop. Then, the error amplifier 202 becomes a comparator, and the output of the error amplifier 202 changes from rail to rail which results in significant changes in switching frequency and duty cycles. The power conversion system 100 thus operates in an on-off mode (e.g., an ON/OFF mode), instead of an error amplifier mode (EA mode). The wide bandwidth of the control loop, however, often negatively affects the stability of the power conversion system 100, even if the output load is steady. A complex compensation network with a large number of external components is usually needed to obtain both good dynamic response and satisfactory stability. But such a compensation network often significantly increases the system cost.

Hence it is highly desirable to improve the techniques of enhancing dynamic responses of power conversion systems.

3. BRIEF SUMMARY OF THE INVENTION

The present invention is directed to integrated circuits. More particularly, the invention provides systems and methods for enhancing dynamic responses. Merely by way of example, the invention has been applied to power conversion systems. But it would be recognized that the invention has a much broader range of applicability.

According to one embodiment, a system controller for regulating a power conversion system includes a first amplifier, a variable-resistance component, a first capacitor, and a modulation and drive component. The first amplifier is configured to receive a reference signal and a feedback signal associated with an output signal of the power conversion system, the first amplifier including an amplifier terminal. The variable-resistance component is associated with a first variable resistance value, the variable-resistance component including a first component terminal and a second component terminal, the first component terminal being coupled with the amplifier terminal. The first capacitor includes a first capacitor terminal and a second capacitor terminal, the first capacitor terminal being coupled with the second component terminal. The modulation and drive component includes a first terminal and a second terminal, the first terminal being coupled with the amplifier terminal, the modulation and drive component being configured to output a drive signal at the second terminal to a switch in order to affect the output signal of the power conversion system. The system controller is configured to set the first variable resistance value to a first resistance magnitude in order to operate in an on-off mode, and set the first variable resistance value to a second resistance magnitude in order to operate in an error amplifier mode. The first resistance magnitude is larger than the second resistance magnitude. The on-off mode is different from the error amplifier mode.

According to another embodiment, a system controller for regulating a power conversion system includes a first amplifier, a second amplifier, a first capacitor, a first switch, a second switch, a third switch, a fourth switch, a first resistor, and a second resistor. The first amplifier includes a first input terminal and a second input terminal and a first output terminal. The second amplifier includes a third input terminal and a fourth input terminal and a second output terminal. The first capacitor includes a first capacitor terminal and a second capacitor terminal. The first switch includes a first switch terminal and a second switch terminal. The second switch includes a third switch terminal and a fourth switch terminal. The third switch includes a fifth switch terminal and a sixth switch terminal. The fourth switch includes a seventh switch terminal and an eighth switch terminal. The first resistor includes a first resistor terminal and a second resistor terminal. The second resistor includes a third resistor terminal and a fourth resistor terminal, the second resistor being associated with a variable resistance value. The seventh switch terminal is coupled to the second output terminal. The eighth switch terminal is coupled to the fourth input terminal, the first capacitor terminal, the second switch terminal, and the first capacitor terminal. The third switch terminal is coupled to the fifth switch terminal. The fourth switch terminal is coupled to the third resistor terminal. The fourth resistor terminal is coupled to the sixth switch terminal, the first resistor terminal, and the first switch terminal.

According to yet another embodiment, a system controller for regulating a power conversion system includes a variable-resistance component, a first amplifier, a first capacitor and a modulation and drive component. The variable-resistance component includes a first component terminal and a second component terminal and is associated with a first variable resistance value. The first amplifier is configured to receive a reference signal and a feedback signal associated with an output signal of the power conversion system, the first amplifier including an amplifier terminal coupled with the first component terminal, the first amplifier being further configured to generate, with at least the variable-resistance component, a first signal based on at least information associated with the feedback signal and the reference signal. The first capacitor includes a first capacitor terminal and a second capacitor terminal, the first capacitor terminal being coupled with the second component terminal. The modulation and drive component includes a first terminal and a second terminal, the first terminal being coupled with the amplifier terminal, the modulation and drive component being configured to output a drive signal at the second terminal to a switch in order to affect the output signal of the power conversion system. The system controller is configured to set the first variable resistance value to a first resistance magnitude in order to operate in a first mode, and set the first variable resistance value to a second resistance magnitude in order to operate in a second mode. The system controller is further configured to, in the first mode, if the feedback signal changes from a first signal magnitude to a second signal magnitude, change the first signal from a third signal magnitude to a fourth signal magnitude during a first time period. The system controller is further configured to, in the second mode, if the feedback signal changes from the first signal magnitude to the second signal magnitude, change the first signal from the third signal magnitude to the fourth signal magnitude during a second time period, the second time period being longer than the first time period in duration.

According to yet another embodiment, a system controller for regulating a power conversion system includes a variable-resistance component, a first amplifier, a first capacitor and a modulation and drive component. The variable-resistance component includes a first component terminal and a second component terminal and is associated with a first variable resistance value. The first amplifier is configured to receive a reference signal and a feedback signal associated with an output load of the power conversion system, the first amplifier including an amplifier terminal coupled with the first component terminal, the first amplifier being further configured to generate, with at least the variable-resistance component, a first signal based on at least information associated with the feedback signal and the reference signal. The first capacitor includes a first capacitor terminal and a second capacitor terminal, the first capacitor terminal being coupled with the second component terminal. In addition, the modulation and drive component includes a third component terminal and a fourth component terminal, the fourth component terminal being coupled with the amplifier terminal, the modulation and drive component being configured to output a drive signal at the third component terminal to a switch in order to affect an output signal of the power conversion system. The system controller is configured to, if the output load remains at a first load magnitude, keep the first signal at a first signal magnitude. Furthermore, the system controller is configured to, if the output load changes from the first load magnitude to a second load magnitude, change the first signal from the first signal magnitude to a second signal magnitude during a first time period and change the first signal from the second signal magnitude to a third signal magnitude during a second time period following the first time period. The system controller is further configured to, if the output load remains at the second load magnitude, keep the first signal at the second signal magnitude. The second time period is longer than the first time period. The third signal magnitude is different from the first signal magnitude.

In one embodiment, a method for regulating a power conversion system includes receiving a reference signal and a feedback signal associated with an output signal of the power conversion system, generating a first signal based on at least information associated with the feedback signal and the reference signal, processing information associated with the first signal, and outputting a drive signal based on at least information associated with the first signal to a switch in order to affect the output signal of the power conversion system. The process for generating a first signal based on at least information associated with the feedback signal and the reference signal includes, if an on-off mode is selected, setting a variable resistance value to a first resistance magnitude, and if an error amplifier mode is selected, setting the variable resistance value to a second resistance magnitude, the second resistance magnitude being smaller than the first resistance magnitude, the on-off mode being different from the error amplifier mode.

In another embodiment, a method for regulating a power conversion system includes receiving a reference signal and a feedback signal associated with an output signal of the power conversion system and processing information associated with the feedback signal and the reference signal. The method further includes generating a first signal based on at least information associated with the feedback signal and the reference signal, processing information associated with the first signal, and outputting a drive signal based on at least information associated with the first signal to a switch in order to affect the output signal of the power conversion system. The process for generating a first signal based on at least information associated with the feedback signal and the reference signal includes, if the power conversion system operates in a first mode, in response to the feedback signal changing from a first signal magnitude to a second signal magnitude, changing the first signal from a third signal magnitude to a fourth signal magnitude during a first time period, and if the power conversion system operates in a second mode, in response to the feedback signal changing from the first signal magnitude to the second signal magnitude, changing the first signal from the third signal magnitude to the fourth signal magnitude during a second time period, the second time period being longer than the first time period in duration.

In yet another embodiment, a method for regulating a power conversion system includes receiving, by at least a first amplifier, a reference signal and a feedback signal associated with an output load of the power conversion system, the first amplifier including an amplifier terminal coupled to a first component terminal of a variable-resistance component, the variable-resistance component further including a second component terminal coupled to a first capacitor. In addition, the method includes processing information associated with the reference signal and the feedback signal, generating, by at least the first amplifier and the variable-resistance component, a first signal based on at least information associated with the feedback signal and the reference signal, and receiving the first signal by at least a modulation and drive component, the modulation and drive component including a third component terminal and a fourth component terminal coupled to the amplifier terminal. Further, the method includes processing information associated with the first signal, and outputting a drive signal to a switch in order to affect an output signal of the power conversion system. The process for generating, by at least the first amplifier and the variable-resistance component, a first signal includes, if the output load remains at a first load magnitude, keeping the first signal at a first signal magnitude. In addition, the process for generating, by at least the first amplifier and the variable-resistance component, a first signal includes, if the output load changes from the first load magnitude to a second load magnitude, changing the first signal from the first signal magnitude to a second signal magnitude during a first time period and changing the first signal from the second signal magnitude to a third signal magnitude during a second time period following the first time period. The process for generating, by at least the first amplifier and the variable-resistance component, a first signal further includes, if the output load remains at the second load magnitude, keeping the first signal at the second signal magnitude. The second time period is longer than the first time period. The third signal magnitude is different from the first signal magnitude.

Many benefits are achieved by way of the present invention over conventional techniques. For example, some embodiments of the present invention implement a control scheme to improve dynamic response and maintain system stability with a simple compensation network and a small number of external components.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

The present invention is directed to integrated circuits. More particularly, the invention provides systems and methods for enhancing dynamic responses. Merely by way of example, the invention has been applied to power conversion systems. But it would be recognized that the invention has a much broader range of applicability.

Figure 1:
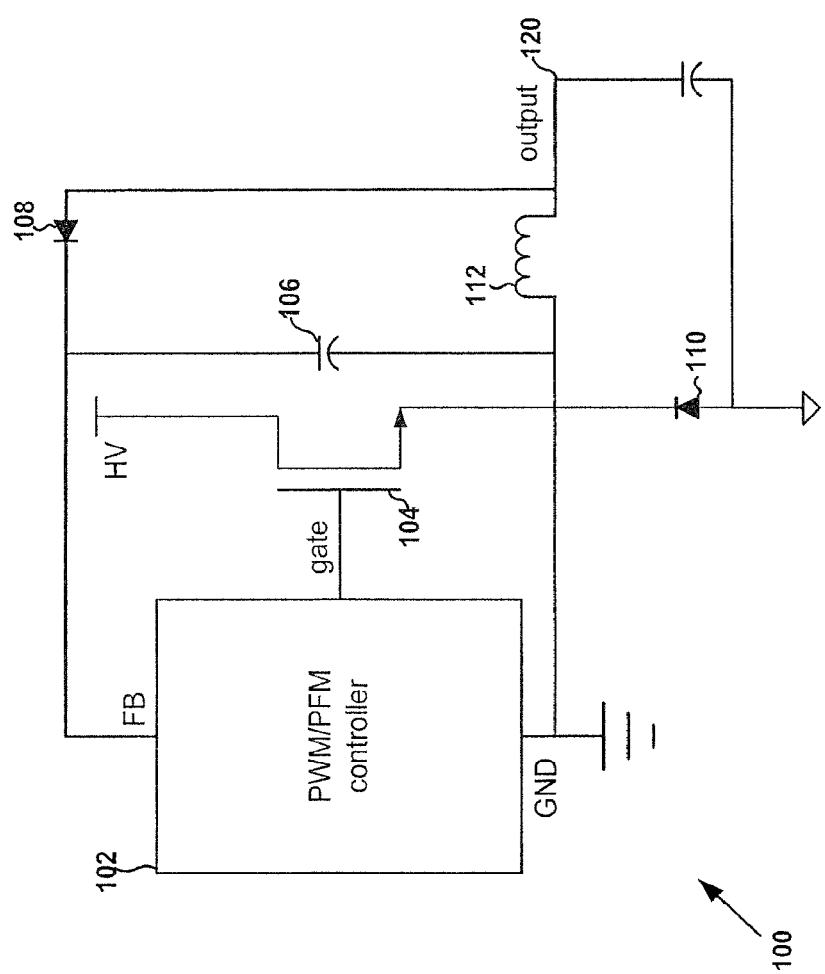
FIG. 1 is a simplified diagram showing a conventional switching power conversion system with a step-down structure.
Figure 2:
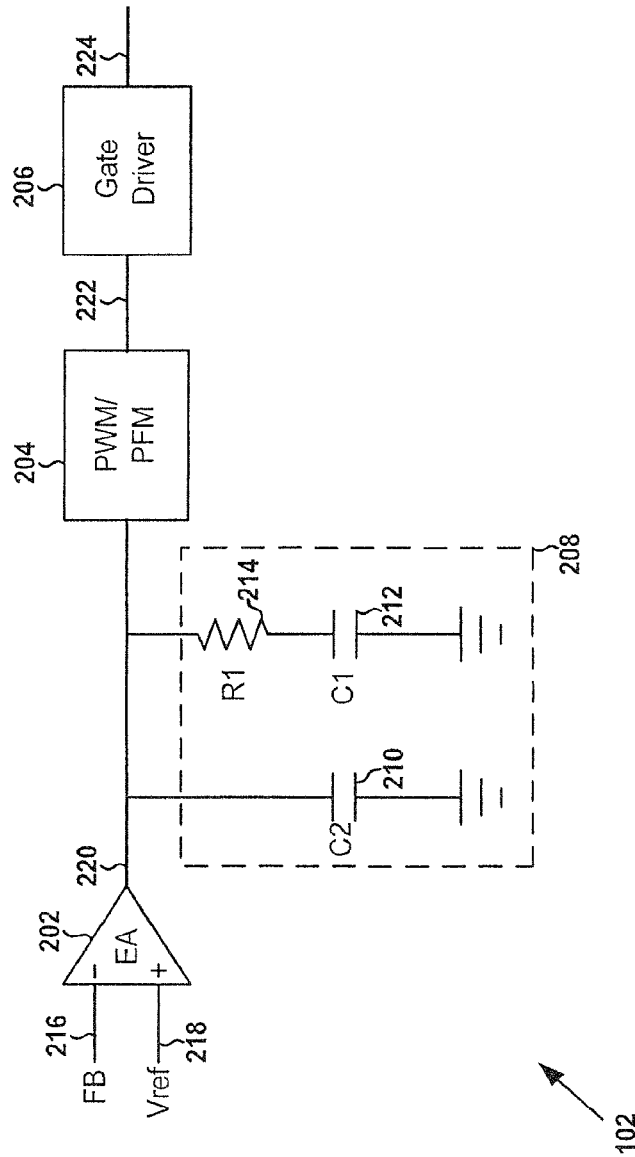
FIG. 2 is a simplified conventional diagram showing certain components of the system controller as part of the power conversion system as shown in FIG. 1.
Figure 3:
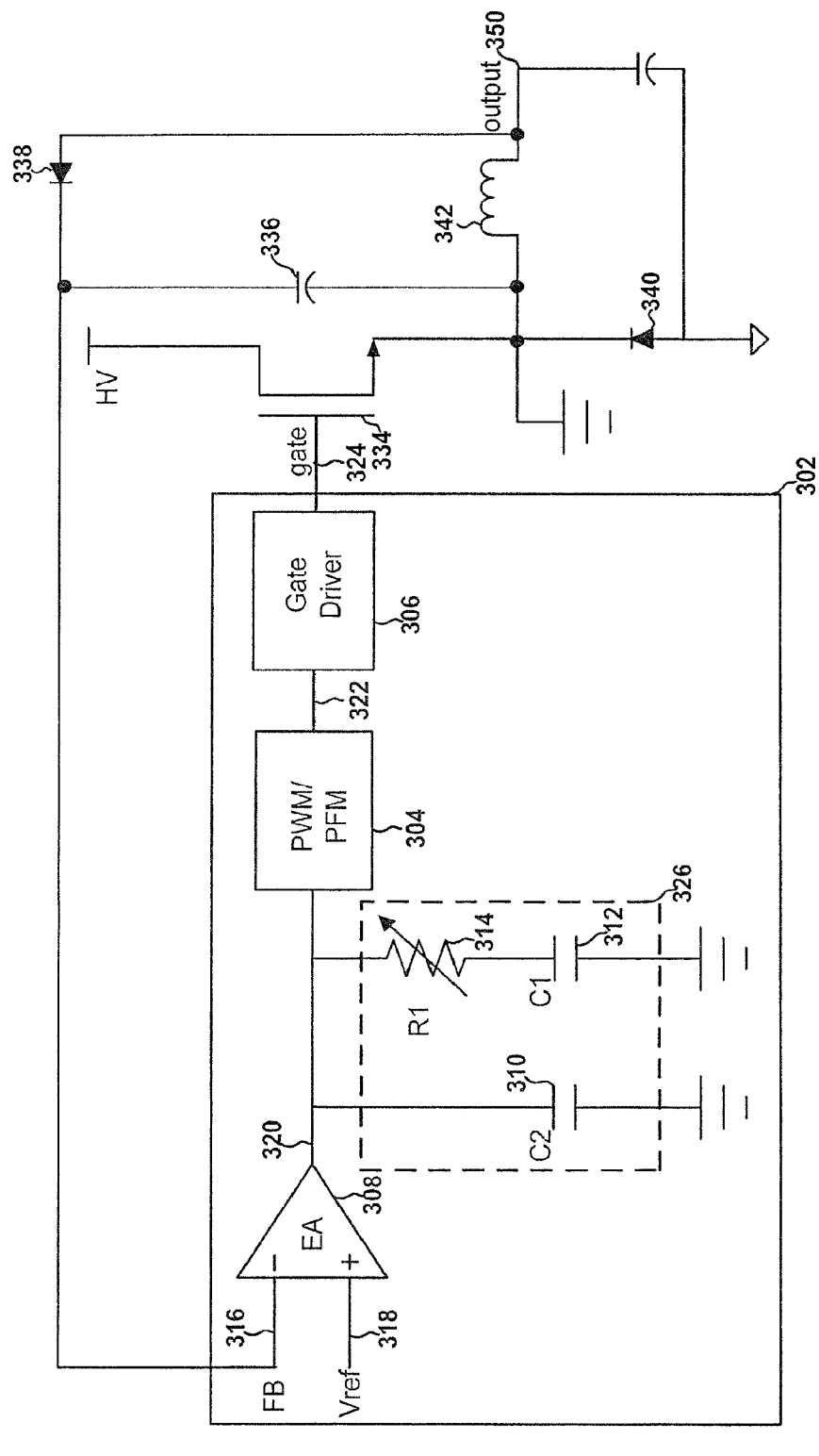
FIG. 3 is a simplified diagram showing a power conversion system according to one embodiment of the present invention.

FIG. 3 is a simplified diagram showing a power conversion system according to one embodiment of the present invention. This diagram is merely an example, which should not unduly limit the scope of the claims. One of ordinary skill in the art would recognize many variations, alternatives, and modifications. The switching power conversion system 300 includes a system controller 302, a switch 334, a capacitor 336, two diodes 338 and 340, and an inductor 342. The system controller 302 includes an error amplifier 308, a modulation component 304, a gate driver 306, and a compensation network 326. The compensation network 326 includes capacitors 310 and 312 and a variable-resistance component 314. For example, the error amplifier 308, the modulation component 304, the gate driver 306, the capacitor 310 and the component 314 are on a same chip, while the capacitor 312 is on a different chip. In another example, the capacitor 312 is on a same chip as the error amplifier 308, the modulation component 304, the gate driver 306, the capacitor 310 and the component 314. In yet another example, the modulation component 304 can perform pulse-width-modulation (PWM) control, and/or pulse-frequencymodulation (PFM) control. In yet another example, the variable-resistance component 314 is a variable resistor.

According to one embodiment, the error amplifier 308 receives a feedback signal 316 that is related to an output voltage 350 and a reference signal 318 and generates a signal 320 which indicates load conditions of the system 300. For example, the modulation component 304 receives the signal 320 and outputs a modulation signal 322 to the gate driver 306 which generates a gate drive signal 324 to drive the switch 334. In another example, the compensation network 326 is connected to an output terminal of the error amplifier 308.

According to another embodiment, the power conversion system 300 operates in an error amplifier mode (EA mode) or an on-off mode. For example, if the resistance of the component 314 has a very large magnitude (e.g., nearly infinity), the compensation capacitor 312 which has a large capacitance is disconnected from the output terminal of the error amplifier 308. Then, the capacitor 310 which has a small capacitance becomes the only load connected to the error amplifier 308, and thus the system 300 operates in the on-off mode in some embodiments. For example, if the resistance of the component 314 becomes very small (e.g., nearly zero), the compensation capacitor 312 is connected to the error amplifier 308, and the system 300 operates in the EA mode. In another example, if the resistance of the component 314 changes between a very large magnitude (e.g., nearly infinity) and a very small magnitude (e.g., nearly zero), the system 300 operates in a transition mode between the EA mode and the on-off mode. In yet another example, if the feedback signal 316 changes in magnitude, in response the signal 320 changes in magnitude much faster in the on-off mode than in the EA mode. In yet another example, if the feedback signal 316 changes from a magnitude larger than the reference signal 318 to a magnitude smaller than the reference signal 318, the signal 320 increases in magnitude much faster in the on-off mode than in the EA mode. In yet another example, if the feedback signal 316 changes from a magnitude smaller than the reference signal 318 to a magnitude larger than the reference signal 318, the signal 320 decreases in magnitude much faster in the on-off mode than in the EA mode.

Figure 4A:
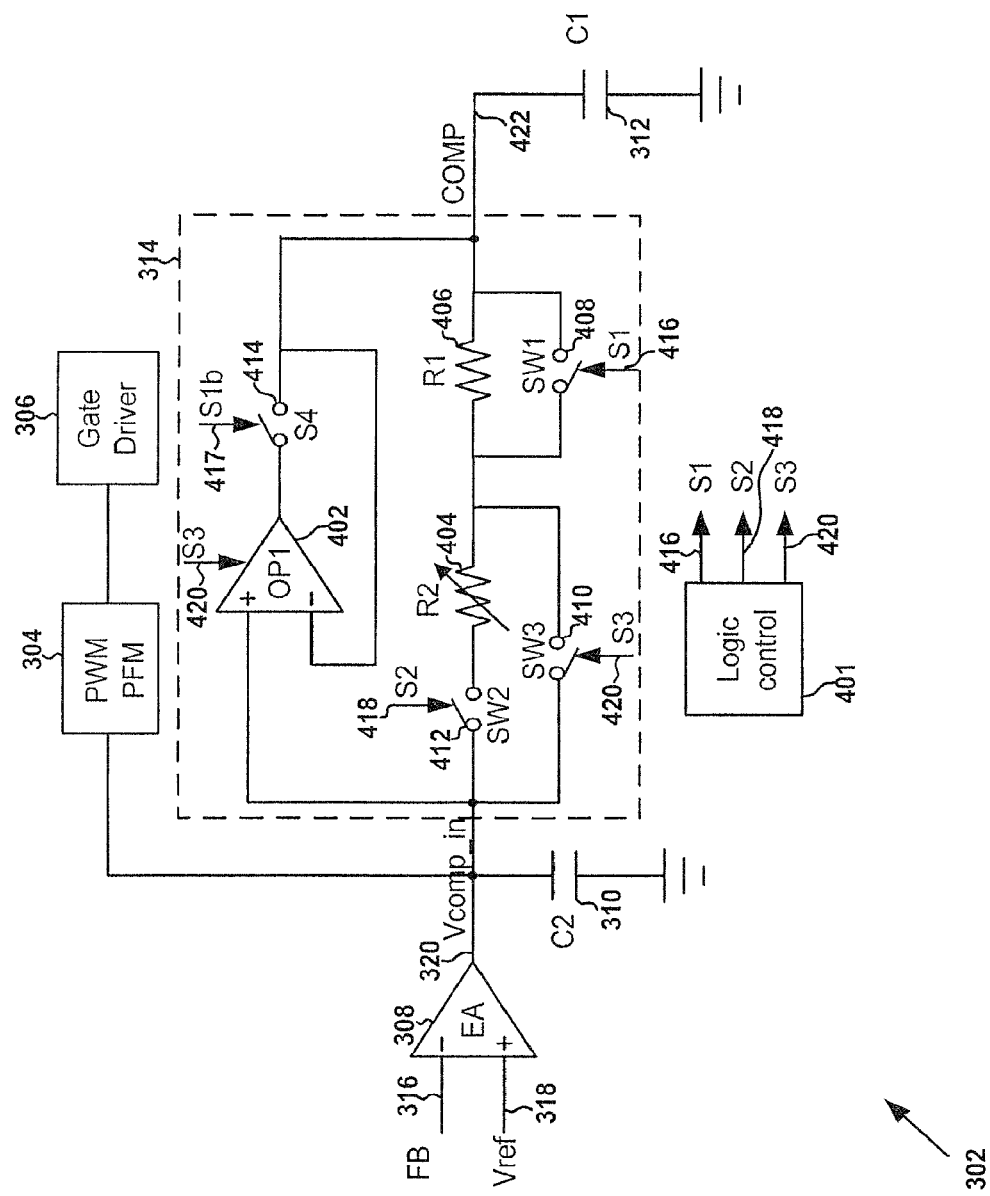
FIG. 4(A) is a simplified diagram showing certain components of the system controller as part of the power conversion system as shown in FIG. 3 according to one embodiment of the present invention.

FIG. 4(A) is a simplified diagram showing certain components of the system controller 302 as part of the power conversion system 300 according to one embodiment of the present invention. This diagram is merely an example, which should not unduly limit the scope of the claims. One of ordinary skill in the art would recognize many variations, alternatives, and modifications. The system controller 302 further includes a logic control component 401. The component 314 includes an amplifier 402, a variable resistor 404, a resistor 406, and switches 408, 410, 412 and 414.

According to one embodiment, the logic control component 401 generates three control signals 416, 418 and 420. For example, the switch 408 is closed or open in response to the control signal 416, and the switch 414 is closed or open in response to a signal 417 which is complementary to the control signal 416. In another example, the switch 412 is closed or open in response to the signal 418, and the switch 410 is closed or open in response to the signal 420. In yet another example, a voltage buffer including the amplifier 402 and the switch 414 receives the signal amplified 320 generated by the error amplifier 308 and outputs a voltage signal 422 to the compensation capacitor 312 if the switch 414 is closed (e.g., on). In yet another example, the capacitor 310 has a small capacitance, and the compensation capacitor 312 has a large capacitance.

Figure 4B:
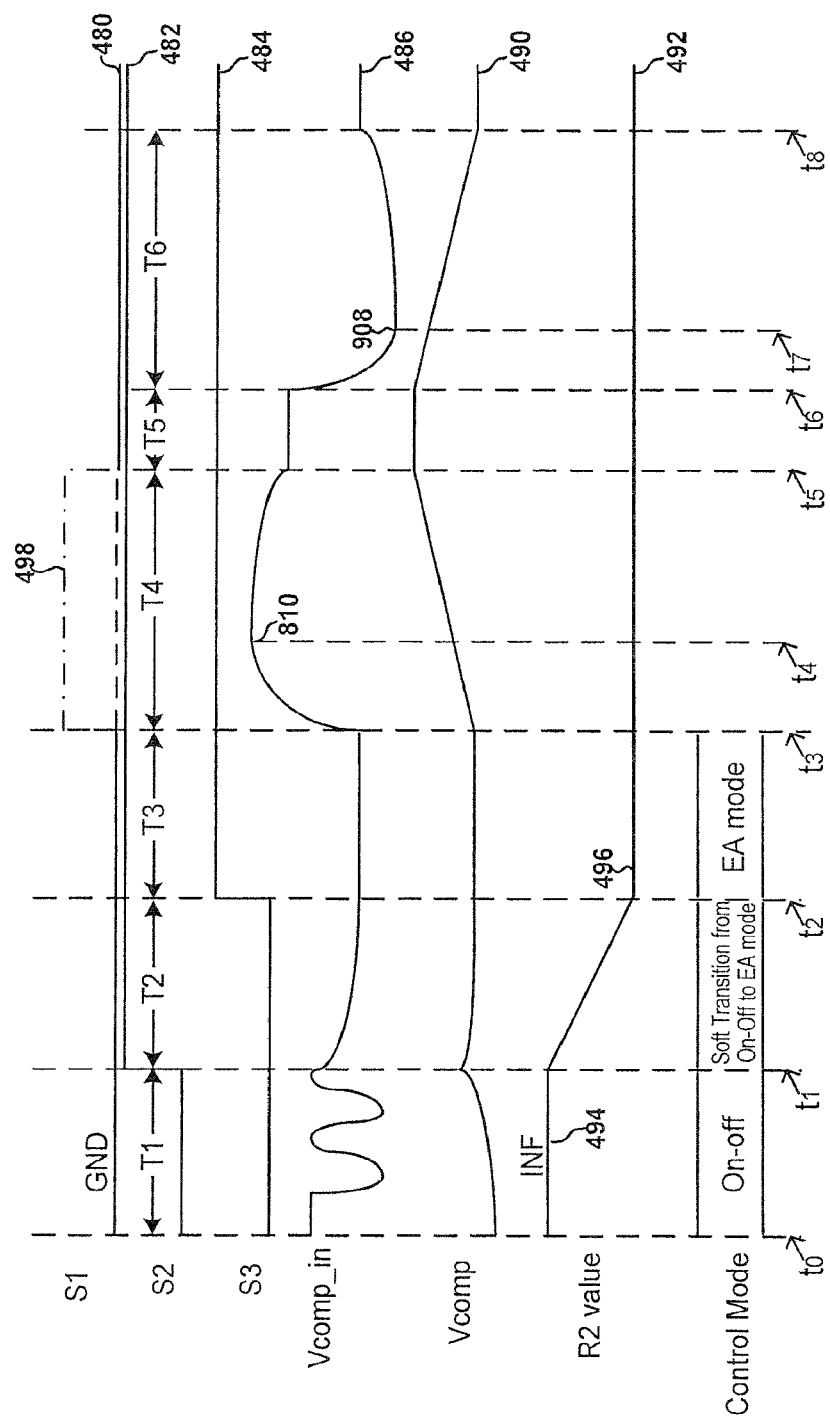
FIG. 4(B) is a simplified timing diagram for the system controller as part of the power conversion system as shown in FIG. 3 according to one embodiment of the present invention.

FIG. 4(B) is a simplified timing diagram for the system controller 302 as part of the power conversion system 300 according to one embodiment of the present invention. This diagram is merely an example, which should not unduly limit the scope of the claims. One of ordinary skill in the art would recognize many variations, alternatives, and modifications. The waveform 480 represents the control signal 416 as a function of time, the waveform 482 represents the control signal 418 as a function of time, and the waveform 484 represents the control signal 420 as a function of time. The waveform 486 represents the signal 320 as a function of time, the waveform 488 represents the voltage signal 422 as a function of time, and the waveform 492 represents the resistance of the resistor 404 as a function of time.

Six time periods, $T_1$, $T_2$, $T_3$, $T_4$, $T_5$ and $T_6$ are shown in FIG. 4(B). For example, the time period $T_1$ starts at time to and ends at time $t_1$, the time period $T_2$ starts at the time $t_1$ and ends at time $t_2$, and the time period $T_3$ starts at the time $t_2$ and ends at time $t_3$. In another example, the time period $T_4$ starts at the time $t_3$ and ends at time $t_5$, the time period $T_5$ starts at the time $t_5$ and ends at time $t_6$, and the time period $T_6$ starts at the time $t_6$ and ends at time $t_5$. In yet another example, $t_0 \leq t_1 \leq t_2 \leq t_3 \leq t_4 \leq t_5 \leq t_6 \leq t_7 \leq t_8$.

According to one embodiment, during the time period $T_1$, the control signals 416, 418 and 420 are all at a logic low level, as shown by the waveforms 480, 482 and 484 respectively. For example, in response, the switches 408, 412 and 410 are open (e.g., off) respectively. In another example, the resistor 404 does not affect the operation of the controller 302. In yet another example, the resistor 404 has a very large magnitude 494 (e.g., nearly infinity) as shown by the waveform 492. The system 300 operates in the on-off mode according to certain embodiments. For example, the signal 417 that is complementary to the signal 416 is at a logic high level, and in response the switch 414 is closed (e.g., on). In yet another example, the amplifier 402 outputs the voltage signal 422 through the closed switch 414, and the compensation capacitor 312 is charged in response.

Figure 5:
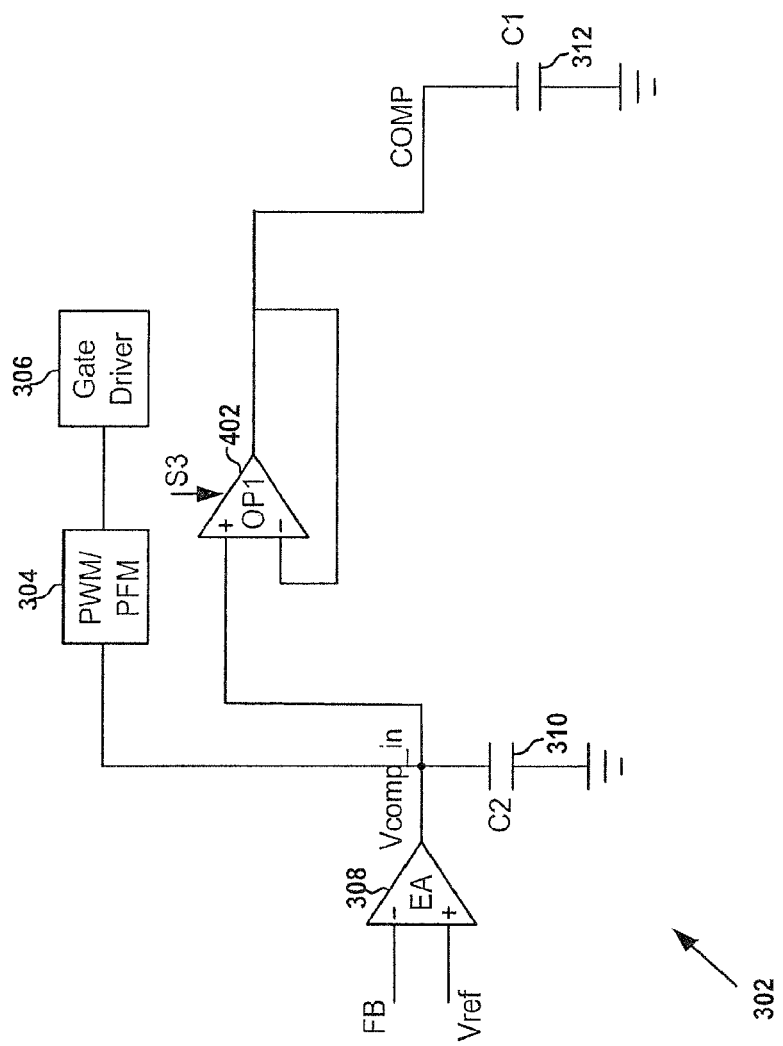
FIG. 5 is a simplified diagram showing certain components of the system controller as part of the power conversion system operating in the on-off mode according to another embodiment of the present invention.

FIG. 5 is a simplified diagram showing certain components of the system controller 302 as part of the power conversion system 300 operating in the on-off mode according to another embodiment of the present invention. This diagram is merely an example, which should not unduly limit the scope of the claims. One of ordinary skill in the art would recognize many variations, alternatives, and modifications. The switches 408, 410, 412 and 414, and the resistors 404 and 406 are omitted in this embodiment.

As shown in FIG. 4(A) and FIG. 5, a bandwidth of the buffering is determined, for example, as follows.

$$BW = \frac{G_{m\_op1}}{C_2} \quad \text{(Equation 1)}$$

where $G_{m\_op1}$ represents a transconductance of the amplifier 402, and $C_2$ represents the capacitance of the capacitor 310.

If the power conversion system 300 operates in the on-off mode (e.g., during $T_1$), the output voltage 350 reaches a stable level without overshoot over a wide range of input AC voltages and load conditions according to certain embodiments. For example, after the output voltage 350 reaches the stable level, the power conversion system 300 enters into a transition mode between the on-off mode and the EA mode (e.g., $T_2$) as shown in FIG. 4(B). In another example, the charges stored on the compensation capacitor 312 smoothes out the transition if the power conversion system 302 enters the time period $T_2$.

According to another embodiment, during the time period $T_2$, the control signal 418 changes to a logic high level, while the control signal 416 and 420 remains at the logic low level (e.g., as shown by the waveforms 480, 482 and 484). For example, in response, the switch 412 is closed (e.g., on), and both the resistor 404 and the resistor 406 are connected between the error amplifier 308 and the compensation capacitor 312. In another example, during the time period $T_2$, the resistance of the resistor 404 decreases (e.g., linearly or non-linearly) from the very large magnitude 494 (e.g., nearly infinity at $t_1$) to a very small magnitude 496 (e.g., nearly zero at $t_2$). In yet another example, the change of resistance of the resistor 404 is controlled by the logic control component 401.

Figure 6:
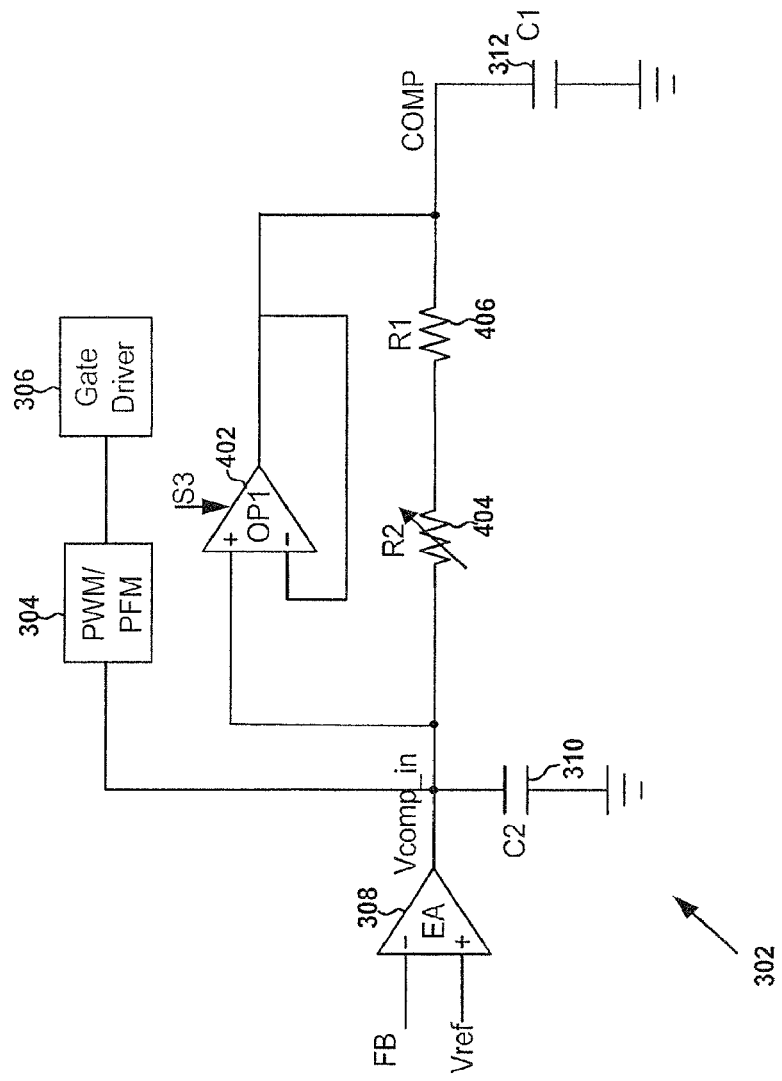
FIG. 6 is a simplified diagram showing certain components of the system controller as part of the power conversion system in the transition mode according to another embodiment of the present invention.

FIG. 6 is a simplified diagram showing certain components of the system controller 302 as part of the power conversion system 300 in the transition mode according to another embodiment of the present invention. This diagram is merely an example, which should not unduly limit the scope of the claims. One of ordinary skill in the art would recognize many variations, alternatives, and modifications. The switches 408, 410, 412 and 414 are omitted in this embodiment.

Referring back to FIG. 4(A) and FIG. 4(B), at the end of the time period $T_2$ (e.g., at $t_2$), the control signal 420 changes from the logic low level to the logic high level in some embodiments. For example, in response the switch 410 is closed (e.g., on) and the resistor 404 is shorted. As the power conversion system 300 enters into the time period $T_3$ (e.g., at $t_2$), the start-up process is completed and the power conversion system 300 begins normal operations according to certain embodiments. For example, during the time period $T_4$, the time period $T_5$, and/or the time period $T_6$, the power conversion system 300 operates in the EA mode.

Figure 7:
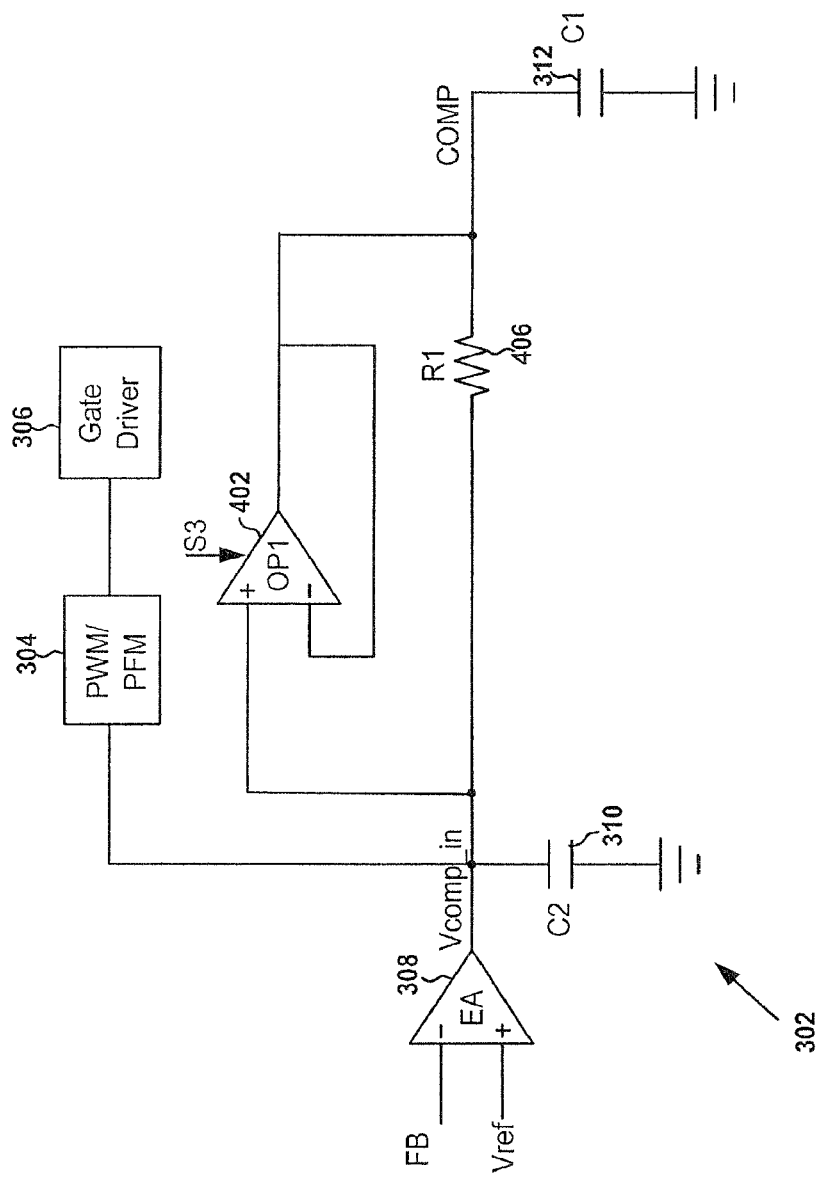
FIG. 7 is a simplified diagram showing certain components of the system controller as part of the power conversion system as shown in FIG. 3 after the start-up process is completed according to yet another embodiment of the present invention.

FIG. 7 is a simplified diagram showing certain components of the system controller 302 as part of the power conversion system 300 after the start-up process is completed according to yet another embodiment of the present invention. This diagram is merely an example, which should not unduly limit the scope of the claims. One of ordinary skill in the art would recognize many variations, alternatives, and modifications. The switches 408, 410, 412 and 414 and the resistor 404 are omitted in this embodiment.

If the power conversion system 300 changes between no/light output load conditions and full/heavy output load conditions, the system controller 302 adjusts accordingly to provide a satisfactory dynamic response in some embodiments. Referring back to FIG. 4(B), for example, if the power conversion system 300 changes from no/light load conditions to full/heavy load conditions at the beginning of the time period $T_4$ (e.g., at $t_3$), in response, the output voltage 350 decreases in magnitude, and the feedback signal 316 also decreases in magnitude. Since the capacitor 310 has a small capacitance and the compensation capacitor 312 is connected to the output terminal of the error amplifier 308, the signal 320 (e.g., $V_{comp\_in}$) increases in magnitude (e.g., as shown by the waveform 486), as an example. In another example, the signal 320 becomes larger in magnitude than the voltage signal 422 (e.g., $V_{comp}$) which indicates the change of the output load conditions. In yet another example, the modulation component 304 increases the switching frequency and/or duty cycles of the system 300 to deliver more power to the output. In yet another example, during the time period $T_4$, the signal 320 (e.g., $V_{comp\_in}$) increases to a maximum magnitude 810 (e.g., at $t_4$) and then decreases to become approximately equal in magnitude to the voltage signal 422 (e.g., $V_{comp}$) at the end of the time period $T_4$ (e.g., $t_5$) as shown by the waveforms 486 and 490. In certain embodiments, during the time period $T_4$, the power conversion system 300 operates in a pseudo-on-off mode which enhances the dynamic response of the system 300. The comparison of the signal 320 and the voltage signal 422 shown in FIG. 8(A) illustrates that the power conversion system 300 operates in such a pseudo-on-off mode.

Figure 8A:
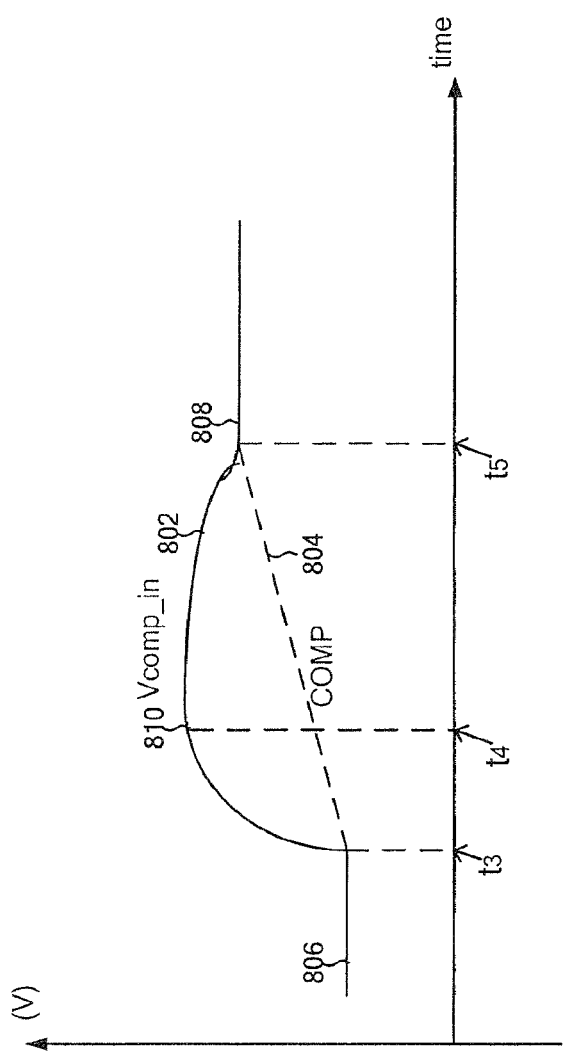
FIG. 8(A) is a simplified timing diagram showing the signal generated by the error amplifier and the voltage generated by the compensation capacitor as parts of the power conversion system as shown in FIG. 3 if the output load changes from no/light load to full/heavy load according to one embodiment of the present invention.

FIG. 8(A) is a simplified timing diagram showing the signal 320 generated by the error amplifier 308 and the voltage 422 generated by the compensation capacitor 312 as parts of the power conversion system 300 if the output load changes from no/light load to full/heavy load according to one embodiment of the present invention. This diagram is merely an example, which should not unduly limit the scope of the claims. One of ordinary skill in the art would recognize many variations, alternatives, and modifications. The waveform 802 represents the signal 320 as a function of time, and the waveform 804 represents the voltage 422 as a function of time.

In one embodiment, before $t_3$, the signal 320 and the voltage 422 have approximately a same magnitude 806 (e.g., as shown by the waveforms 802 and 804). For example, after $t_3$, the signal 320 increases in magnitude much faster than the voltage 422. In another example, the signal 320 reaches the maximum magnitude 810 (e.g., at $t_4$) and then begins to decreases in magnitude (e.g., as shown by the waveform 802). In yet another example, at the end of the time period $T_4$, the signal 320 and the voltage 422 have approximately a same magnitude 808 (e.g., at $t_5$ as shown by the waveforms 802 and 804). In yet another example, the time period between $t_3$ and $t_4$ is much shorter than the time period between $t_4$ and $t_5$.

If the signal 320 increases to the maximum magnitude 810 too quickly and/or the maximum magnitude 810 is too high, the power conversion system 300 essentially enters the on-off mode which may results in output instability and/or audible noise according to certain embodiments. For example, in order to keep the power conversion system 300 from entering the on-off mode, the logic control component 401 changes the control signal 416 to the logic high level (e.g., the magnitude 498 as shown in FIG. 4(B)) to close the switch 408. In another example, the resistor 406 is thus shorted, and the compensation capacitor 312 is connected directly to the output terminal of the error amplifier 308 as shown in FIG. 8(B).

Figure 8B:
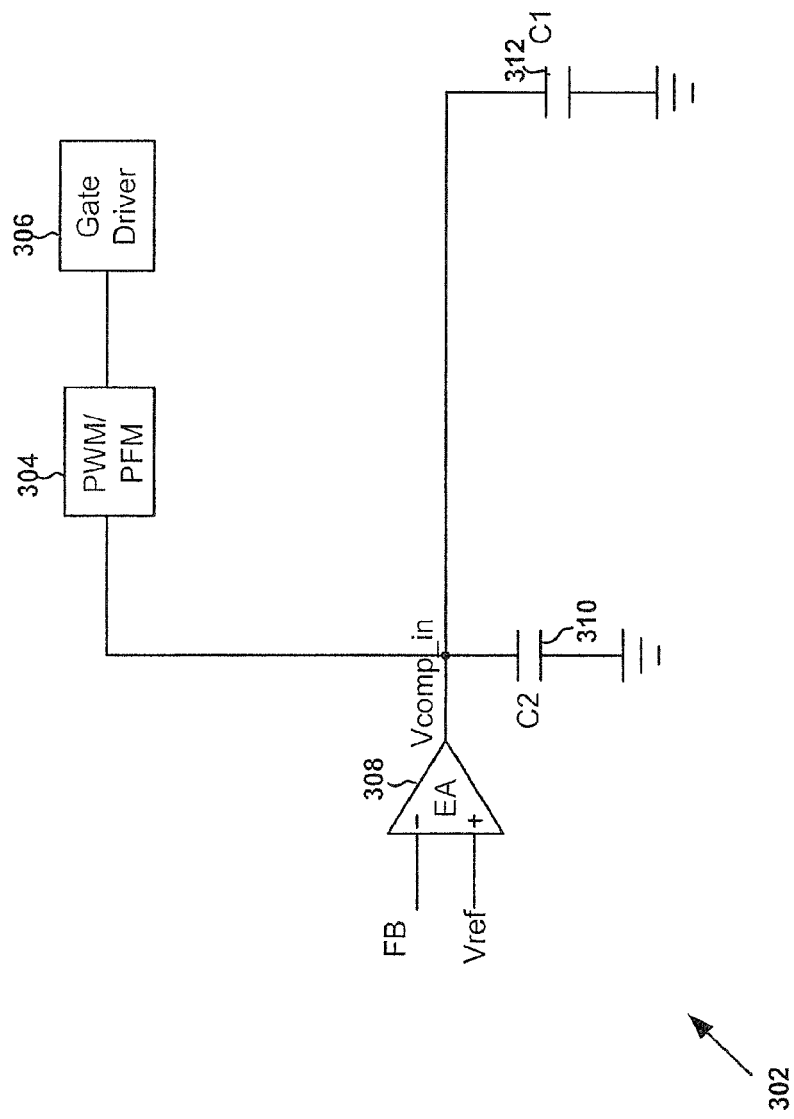
FIG. 8(B) is a simplified diagram showing certain components of the system controller as part of the power conversion system if the output load changes from no/light load to full/heavy load according to another embodiment of the present invention.

FIG. 8(B) is a simplified diagram showing certain components of the system controller 302 as part of the power conversion system 300 if the output load changes from no/light load to full/heavy load according to another embodiment of the present invention. This diagram is merely an example, which should not unduly limit the scope of the claims. One of ordinary skill in the art would recognize many variations, alternatives, and modifications. The switches 408, 410, 412 and 414, the resistors 404 and 406, and the amplifier 402 are omitted in this embodiment.

Referring back to FIG. 4(B), after the signal 320 (e.g., $V_{comp\_in}$) and the voltage signal 422 (e.g., $V_{comp}$) become approximately equal in magnitude at the end of the time period $T_4$ (e.g., $t_5$), the power conversion system 300 returns to the normal operations in the error amplifier mode and the signal 320 (e.g., $V_{comp\_in}$) and the voltage signal 422 (e.g., $V_{comp}$) remain approximately unchanged in magnitude during the time period $T_5$ (e.g., as shown by the waveforms 486 and 490).

In one embodiment, if the power conversion system 300 changes from full/heavy load conditions to no/light load conditions at the beginning of the time period $T_6$ (e.g., at $t_6$), in response, the output voltage 350 increases in magnitude, and the feedback signal 316 also increases in magnitude. Since the capacitor 310 has a small capacitance and the compensation capacitor 312 is connected to the output terminal of the error amplifier 308, the signal 320 (e.g., $V_{comp\_in}$) decreases in magnitude (e.g., at $t_6$ as shown by the waveform 486), as an example. In another example, the signal 320 becomes lower in magnitude than the voltage signal 422 (e.g., $V_{comp}$) which indicates the change of the output load conditions. In yet another example, the modulation component 304 decreases the switching frequency and/or duty cycles of the system 300 to deliver less power to the output. In yet another example, during the time period $T_6$, the signal 320 (e.g., $V_{comp\_in}$) decreases to a minimum magnitude 908 (e.g., at $t_7$) and then increases to become approximately equal in magnitude to the voltage signal 422 (e.g., $V_{comp}$) at the end of the time period $T_6$ (e.g., at $t_8$ as shown by the waveforms 486 and 490). In certain embodiments, during the time period $T_6$, the power conversion system 300 operates in a pseudo-on-off mode which enhances the dynamic response of the system 300. The comparison of the signal 320 and the voltage signal 422 shown in FIG. 9 illustrates that the power conversion system 300 operates in such a pseudo-on-off mode.

Figure 9:
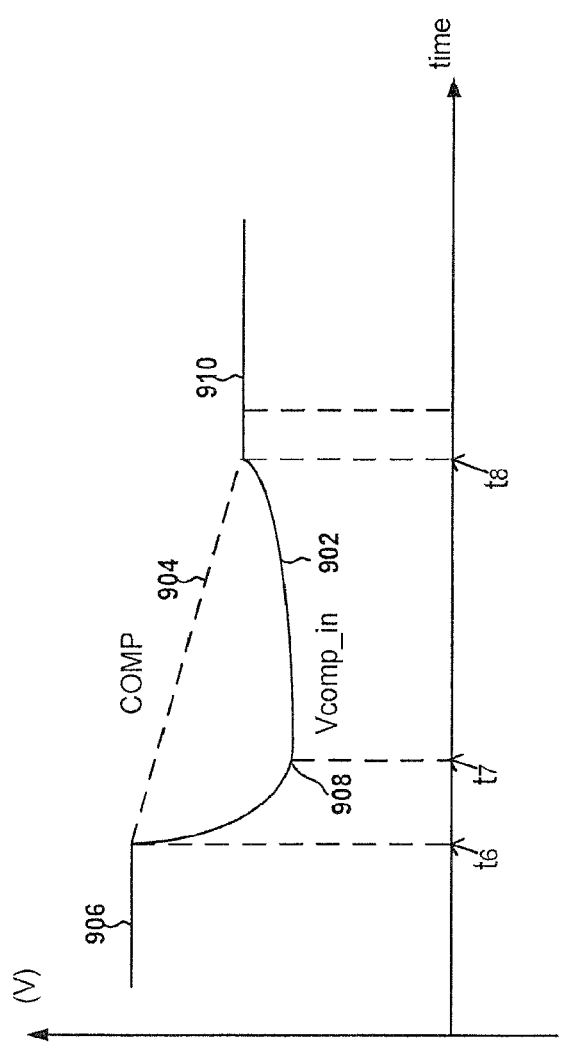
FIG. 9 is a simplified timing diagram showing the signal generated by the error amplifier and the voltage generated by the compensation capacitor as parts of the power conversion system if the output load changes from full/heavy load to no/light load according to another embodiment of the present invention.

FIG. 9 is a simplified timing diagram showing the signal 320 generated by the error amplifier 308 and the voltage 422 generated by the compensation capacitor 312 as parts of the power conversion system 300 if the output load changes from full/heavy load to no/light load according to another embodiment of the present invention. This diagram is merely an example, which should not unduly limit the scope of the claims. One of ordinary skill in the art would recognize many variations, alternatives, and modifications. The waveform 902 represents the signal 320 as a function of time, and the waveform 904 represents the voltage 422 as a function of time.

In one embodiment, before $t_6$, the signal 320 and the voltage 422 have approximately a same magnitude 906 (e.g., as shown by the waveforms 902 and 904). For example, after $t_6$, the signal 320 decreases in magnitude much faster than the voltage 422. In another example, the signal 320 reaches the minimum magnitude 908 (e.g., at $t_7$) and then begins to increases in magnitude (e.g., as shown by the waveform 902). In yet another example, at the end of the time period $T_6$, the signal 320 and the voltage 422 have approximately a same magnitude 910 (e.g., at $t_5$ as shown by the waveforms 902 and 904). In yet another example, the time period between $t_6$ and $t_7$ is much shorter than the time period between $t_7$ and $t_5$. In yet another example, after the time period $T_6$, the signal 320 and the voltage 422 keep at the magnitude 910, and the system 300 performs normal operations in the error amplifier mode.

As discussed above and further emphasized here, FIGS. 4(A), 4(B), 8(A) and 9 are merely examples, which should not unduly limit the scope of the claims. One of ordinary skill in the art would recognize many variations, alternatives, and modifications. For example, the logic control component 401 detects when the start-up process of the power conversion system 300 begins, and determines whether the system controller 302 should operate in the on-off mode, in the transition mode between the on-off mode to the error amplifier mode, or in the error amplifier mode. In one embodiment, the system controller 302 operates in the on-off mode, then in the transition mode between the on-off mode to the error amplifier mode, and then in the error amplifier mode, sequentially in time since the beginning of the start-up process. In another embodiment, the system controller 302 operates in the on-off mode for the time period $T_1$, then in the transition mode between the on-off mode to the error amplifier mode for the time period $T_2$, and then in the error amplifier mode for the time period $T_3$. In yet another embodiment, the durations of the time period $T_1$, the time period $T_2$ and/or the time period $T_3$ are determined by the logic control component 401 through the signals 416, 418 and/or 420.

In another example, the logic control component 401 detects changes in load condition (e.g., through the signal 422 and/or the signal 320), and determines whether the signals 416, 418 and/or 420 should be changed (e.g., during the time period $T_4$, the time period $T_5$, and/or the time period $T_6$). In one embodiment, the time period $T_6$ precedes the time period $T_4$. In another embodiment, if the output load of the power conversion system 300 does not change from no/light load to full/heavy load, the time period $T_4$ is omitted from FIG. 4(B). In yet another embodiment, if the output load of the power conversion system 300 does not change from full/heavy load to no/light load, the time period $T_6$ is omitted. In yet another embodiment, if the output load of the power conversion system 300 does not change from no/light load to full/heavy load and does not change from full/heavy load to no/light load, both the time period $T_4$ and the time period $T_6$ are omitted; hence the time period $T_3$ continues and the power conversion system 300 performs normal operations under the error amplifier mode.

According to another embodiment, a system controller for regulating a power conversion system includes a first amplifier (e.g., the amplifier 308), a variable-resistance component (e.g., the component 314), a first capacitor (e.g., the capacitor 312), and a modulation and drive component (e.g., the modulation component 304 and the gate driver 306). The first amplifier is configured to receive a reference signal and a feedback signal associated with an output signal of the power conversion system, the first amplifier including an amplifier terminal. The variable-resistance component is associated with a first variable resistance value, the variable-resistance component including a first component terminal and a second component terminal, the first component terminal being coupled with the amplifier terminal. The first capacitor includes a first capacitor terminal and a second capacitor terminal, the first capacitor terminal being coupled with the second component terminal. The modulation and drive component includes a first terminal and a second terminal, the first terminal being coupled with the amplifier terminal, the modulation and drive component being configured to output a drive signal at the second terminal to a switch in order to affect the output signal of the power conversion system. The system controller is configured to set the first variable resistance value to a first resistance magnitude in order to operate in an on-off mode, and set the first variable resistance value to a second resistance magnitude in order to operate in an error amplifier mode. The first resistance magnitude is larger than the second resistance magnitude. The on-off mode is different from the error amplifier mode. For example, the system controller is implemented according to FIG. 3, FIG. 4(A), FIG. 4(B), FIG. 5, FIG. 6, FIG. 7, FIG. 8(A), FIG. 8(B), and/or FIG. 9.

In one embodiment, the first amplifier is configured to generate, with at least the variable-resistance component, a first signal based on at least information associated with the feedback signal and the reference signal. For example, the modulation and drive component is configured to receive the first signal and generate the drive signal based on at least information associated with the first signal. In another example, the system controller includes a second capacitor including a third capacitor terminal and a fourth capacitor terminal, the third capacitor terminal being coupled to the amplifier terminal. In yet another example, the system controller is further configured to detect a second signal associated with the first capacitor terminal, if the first signal is larger than the second signal in magnitude, change the drive signal in order to increase the output signal in magnitude, and if the first signal is smaller than the second signal in magnitude, change the drive signal in order to decrease the output signal in magnitude.

In another embodiment, the system controller is further configured to, in the on-off mode, if the feedback signal changes from a first signal magnitude to a second signal magnitude, change the first signal from a third signal magnitude to a fourth signal magnitude during a first time period. For example, the system controller is further configured to, in the error amplifier mode, if the feedback signal changes from the first signal magnitude to the second signal magnitude, change the first signal from the third signal magnitude to the fourth signal magnitude during a second time period. In another example, the second time period is longer than the first time period in duration. In yet another example, the first signal magnitude is smaller than the reference signal, and the second signal magnitude is larger than the reference signal. In yet another example, the first signal magnitude is larger than the reference signal, and the second signal magnitude is smaller than the reference signal.

In yet another embodiment, the system controller is further configured to, during a first time period, set the first variable resistance value to the first resistance magnitude in order to operate in the on-off mode, during a second time period, change the first variable resistance value from the first resistance magnitude to the second resistance magnitude, and during a third time period, set the first variable resistance value to the second resistance magnitude in order to operate in the error amplifier mode. For example, the modulation and drive component includes a modulation component and a gate drive component. In another example, the modulation component is configured to generate a modulation signal based on at least information associated with the first signal. In yet another example, the gate drive component is configured to receive the modulation signal and generate the drive signal based on at least information associated with the modulation signal. In yet another example, the first capacitor terminal is coupled directly with the second component terminal.

In yet another embodiment, the system controller further includes a second capacitor including a third capacitor terminal and a fourth capacitor terminal, the third capacitor terminal being coupled to the amplifier terminal. For example, the variable-resistance component includes a second amplifier configured to receive a first signal generated by at least the second capacitor and output a second signal based on at least information associated with the first signal, the second signal being equal in magnitude to an average of the first signal over a time period. In another example, during the time period, the system controller operates in the on-off mode. In yet another example, during the time period, the system controller operates in the error amplifier mode. In yet another example, during the time period, the system controller operates to change from the on-off mode to the error amplifier mode.

According to another embodiment, a system controller for regulating a power conversion system includes a first amplifier (e.g., the amplifier 308), a second amplifier (e.g., the amplifier 402), a first capacitor (e.g., the capacitor 312), a first switch (e.g., the switch 408), a second switch (e.g., the switch 412), a third switch (e.g., the switch 410), a fourth switch (e.g., the switch 414), a first resistor (e.g., the resistor 406), and a second resistor (e.g., the resistor 404). The first amplifier includes a first input terminal and a second input terminal and a first output terminal. The second amplifier includes a third input terminal and a fourth input terminal and a second output terminal. The first capacitor includes a first capacitor terminal and a second capacitor terminal. The first switch includes a first switch terminal and a second switch terminal. The second switch includes a third switch terminal and a fourth switch terminal. The third switch includes a fifth switch terminal and a sixth switch terminal. The fourth switch includes a seventh switch terminal and an eighth switch terminal. The first resistor includes a first resistor terminal and a second resistor terminal. The second resistor includes a third resistor terminal and a fourth resistor terminal, the second resistor being associated with a variable resistance value. The seventh switch terminal is coupled to the second output terminal. The eighth switch terminal is coupled to the fourth input terminal, the first capacitor terminal, the second switch terminal, and the first capacitor terminal. The third switch terminal is coupled to the fifth switch terminal. The fourth switch terminal is coupled to the third resistor terminal. The fourth resistor terminal is coupled to the sixth switch terminal, the first resistor terminal, and the first switch terminal. For example, the system controller is implemented according to at least FIG. 3 and/or FIG. 4(A).

In one embodiment, the first amplifier is further configured to receive at the first input terminal a feedback signal associated with an output signal of the power conversion system and a reference signal at the second input terminal and generate at the first output terminal a first signal based on at least information associated with the feedback signal and the reference signal. For example, the system controller further includes a modulation and drive component including a first terminal and a second terminal, the first terminal being coupled with the first output terminal, the modulation and drive component being configured to output a drive signal at the second terminal to a switch in order to affect the output signal of the power conversion system. In another example, the system controller further includes a second capacitor including a third capacitor terminal and a fourth capacitor terminal, the third capacitor terminal being coupled to the first output terminal. In yet another example, the system controller is further configured to detect a second signal associated with the first capacitor terminal, if the first signal is larger than the second signal in magnitude, change the drive signal in order to increase the output signal in magnitude, and if the first signal is smaller than the second signal in magnitude, change the drive signal in order to decrease the output signal in magnitude.

In another embodiment, the system controller further includes a logic control component configured to generate a first control signal, a second control signal and a third control signal. For example, during a first time period, the first switch is configured to be open in response to the first control signal, the second switch is configured to be open in response to the second control signal, the third switch is configured to be open in response to the third control signal, and the fourth switch is configured to be closed in response to the first control signal. In another example, during a second time period, the first switch is configured to be open in response to the first control signal, the second switch is configured to be closed in response to the second control signal, the third switch is configured to be open in response to the third control signal, and the fourth switch is configured to be closed in response to the first control signal. In yet another example, during a third time period, the first switch is configured to be open in response to the first control signal, the second switch is configured to be closed in response to the second control signal, the third switch is configured to be closed in response to the third control signal, and the fourth switch is configured to be closed in response to the first control signal.

According to yet another embodiment, a system controller for regulating a power conversion system includes a variable-resistance component (e.g., the component 314), a first amplifier (e.g., the amplifier 308), a first capacitor (e.g., the capacitor 312) and a modulation and drive component (e.g., the modulation component 304 and the gate driver 306). The variable-resistance component includes a first component terminal and a second component terminal and is associated with a first variable resistance value. The first amplifier is configured to receive a reference signal and a feedback signal associated with an output signal of the power conversion system, the first amplifier including an amplifier terminal coupled with the first component terminal, the first amplifier being further configured to generate, with at least the variable-resistance component, a first signal based on at least information associated with the feedback signal and the reference signal. The first capacitor includes a first capacitor terminal and a second capacitor terminal, the first capacitor terminal being coupled with the second component terminal. The modulation and drive component includes a first terminal and a second terminal, the first terminal being coupled with the amplifier terminal, the modulation and drive component being configured to output a drive signal at the second terminal to a switch in order to affect the output signal of the power conversion system. The system controller is configured to set the first variable resistance value to a first resistance magnitude in order to operate in a first mode, and set the first variable resistance value to a second resistance magnitude in order to operate in a second mode. The system controller is further configured to, in the first mode, if the feedback signal changes from a first signal magnitude to a second signal magnitude, change the first signal from a third signal magnitude to a fourth signal magnitude during a first time period. The system controller is further configured to, in the second mode, if the feedback signal changes from the first signal magnitude to the second signal magnitude, change the first signal from the third signal magnitude to the fourth signal magnitude during a second time period, the second time period being longer than the first time period in duration. For example, the system controller is implemented according to FIG. 3, FIG. 4(A), FIG. 4(B), FIG. 5, FIG. 6, FIG. 7, FIG. 8(A), FIG. 8(B), and/or FIG. 9.

In one embodiment, the second resistance magnitude is smaller than the first resistance magnitude. For example, the first signal magnitude is smaller than the reference signal, and the second signal magnitude is larger than the reference signal. In another example, the first signal magnitude is larger than the reference signal, and the second signal magnitude is smaller than the reference signal.

In another embodiment, the system controller further includes a second capacitor including a third capacitor terminal and a fourth capacitor terminal, the third capacitor terminal being coupled to the amplifier terminal. For example, the variable-resistance component includes a second amplifier configured to receive a first signal generated by at least the second capacitor and output a second signal based on at least information associated with the first signal, the second signal being equal in magnitude to an average of the first signal over a time period. In another example, during the time period, the system controller operates in the on-off mode. In yet another example, during the time period, the system controller operates in the error amplifier mode. In yet another example, during the time period, the system controller operates to change from the on-off mode to the error amplifier mode.

In yet another embodiment, a system controller for regulating a power conversion system includes a variable-resistance component, a first amplifier, a first capacitor and a modulation and drive component. The variable-resistance component includes a first component terminal and a second component terminal and is associated with a first variable resistance value. The first amplifier is configured to receive a reference signal and a feedback signal associated with an output load of the power conversion system, the first amplifier including an amplifier terminal coupled with the first component terminal, the first amplifier being further configured to generate, with at least the variable-resistance component, a first signal based on at least information associated with the feedback signal and the reference signal. The first capacitor includes a first capacitor terminal and a second capacitor terminal, the first capacitor terminal being coupled with the second component terminal. In addition, the modulation and drive component includes a third component terminal and a fourth component terminal, the fourth component terminal being coupled with the amplifier terminal, the modulation and drive component being configured to output a drive signal at the third component terminal to a switch in order to affect an output signal of the power conversion system. The system controller is configured to, if the output load remains at a first load magnitude, keep the first signal at a first signal magnitude. Furthermore, the system controller is configured to, if the output load changes from the first load magnitude to a second load magnitude, change the first signal from the first signal magnitude to a second signal magnitude during a first time period and change the first signal from the second signal magnitude to a third signal magnitude during a second time period following the first time period. The system controller is further configured to, if the output load remains at the second load magnitude, keep the first signal at the second signal magnitude. The second time period is longer than the first time period. The third signal magnitude is different from the first signal magnitude. For example, the system controller is implemented according to FIG. 3, FIG. 4(A), FIG. 4(B), FIG. 7, FIG. 8(A), FIG. 8(B), and/or FIG. 9.

According to another embodiment, a method for regulating a power conversion system includes receiving a reference signal and a feedback signal associated with an output signal of the power conversion system, generating a first signal based on at least information associated with the feedback signal and the reference signal, processing information associated with the first signal, and outputting a drive signal based on at least information associated with the first signal to a switch in order to affect the output signal of the power conversion system. The process for generating a first signal based on at least information associated with the feedback signal and the reference signal includes, if an on-off mode is selected, setting a variable resistance value to a first resistance magnitude, and if an error amplifier mode is selected, setting the variable resistance value to a second resistance magnitude, the second resistance magnitude being smaller than the first resistance magnitude, the on-off mode being different from the error amplifier mode. For example, the method is implemented according to FIG. 3, FIG. 4(A), FIG. 4(B), FIG. 5, FIG. 6, FIG. 7, FIG. 8(A), FIG. 8(B), and/or FIG. 9.

According to yet another embodiment, a method for regulating a power conversion system includes receiving a reference signal and a feedback signal associated with an output signal of the power conversion system and processing information associated with the feedback signal and the reference signal. The method further includes generating a first signal based on at least information associated with the feedback signal and the reference signal, processing information associated with the first signal, and outputting a drive signal based on at least information associated with the first signal to a switch in order to affect the output signal of the power conversion system. The process for generating a first signal based on at least information associated with the feedback signal and the reference signal includes, if the power conversion system operates in a first mode, in response to the feedback signal changing from a first signal magnitude to a second signal magnitude, changing the first signal from a third signal magnitude to a fourth signal magnitude during a first time period, and if the power conversion system operates in a second mode, in response to the feedback signal changing from the first signal magnitude to the second signal magnitude, changing the first signal from the third signal magnitude to the fourth signal magnitude during a second time period, the second time period being longer than the first time period in duration. For example, the method is implemented according to FIG. 3, FIG. 4(A), FIG. 4(B), FIG. 5, FIG. 6, FIG. 7, FIG. 8(A), FIG. 8(B), and/or FIG. 9.

In one embodiment, a method for regulating a power conversion system includes receiving, by at least a first amplifier, a reference signal and a feedback signal associated with an output load of the power conversion system, the first amplifier including an amplifier terminal coupled to a first component terminal of a variable-resistance component, the variable-resistance component further including a second component terminal coupled to a first capacitor. In addition, the method includes processing information associated with the reference signal and the feedback signal, generating, by at least the first amplifier and the variable-resistance component, a first signal based on at least information associated with the feedback signal and the reference signal, and receiving the first signal by at least a modulation and drive component, the modulation and drive component including a third component terminal and a fourth component terminal coupled to the amplifier terminal. Further, the method includes processing information associated with the first signal, and outputting a drive signal to a switch in order to affect an output signal of the power conversion system. The process for generating, by at least the first amplifier and the variable-resistance component, a first signal includes, if the output load remains at a first load magnitude, keeping the first signal at a first signal magnitude. In addition, the process for generating, by at least the first amplifier and the variable-resistance component, a first signal includes, if the output load changes from the first load magnitude to a second load magnitude, changing the first signal from the first signal magnitude to a second signal magnitude during a first time period and changing the first signal from the second signal magnitude to a third signal magnitude during a second time period following the first time period. The process for generating, by at least the first amplifier and the variable-resistance component, a first signal further includes, if the output load remains at the second load magnitude, keeping the first signal at the second signal magnitude. The second time period is longer than the first time period. The third signal magnitude is different from the first signal magnitude. For example, the method is implemented according to FIG. 3, FIG. 4(A), FIG. 4(B), FIG. 7, FIG. 8(A), FIG. 8(B), and/or FIG. 9.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system controller for regulating a power conversion system, the system controller comprising:
a variable-resistor associated with a first variable resistance value, the variable-resistor including a first variable-resistor terminal and a second variable-resistor terminal;
and
a signal generator including a first terminal and a second terminal, the first terminal being coupled with the first variable-resistor terminal and an amplifier terminal of an amplifier, the signal generator being configured to output a drive signal at the second terminal to a switch in order to affect an output signal of the power conversion system;
wherein the system controller is configured to:
during a first time period, set the first variable resistance value to a first resistance magnitude in order to operate in a first mode;
during a second time period, change the first variable resistance value from the first resistance magnitude to a second resistance magnitude; and
during a third time period, set the first variable resistance value to the second resistance magnitude in order to operate in a second mode;
wherein:
the first resistance magnitude is larger than the second resistance magnitude;
the first mode is different from the second mode;
the first time period precedes the second time period, the second time period beginning immediately after the first time period ends; and
the second time period precedes the third time period, the third time period beginning immediately after the second time period ends.

2. The system controller of claim 1 wherein:
the signal generator includes a modulation component and a gate drive component;
the modulation component is configured to generate a modulation signal; and the gate drive component is configured to receive the modulation signal and generate the drive signal based on at least information associated with the modulation signal.

3. The system controller of claim 1 wherein:

the variable-resistor is associated with a second variable resistance value; and the variable resistor is configured to, during the second time period, decrease, linearly or non-linearly, the second variable resistance value in magnitude from a third resistance magnitude to a fourth resistance magnitude;

wherein the third resistance magnitude is larger than the fourth resistance magnitude.

* * * * *